(12) United States Patent
Clevenger et al.

(10) Patent No.: US 10,083,272 B2
(45) Date of Patent: Sep. 25, 2018

(54) INTEGRATED CIRCUIT DESIGN LAYOUT OPTIMIZER BASED ON PROCESS VARIATION AND FAILURE MECHANISM

(71) Applicant: INTERNATIONAL BUSINESS MACHINES CORPORATION, Armonk, NY (US)

(72) Inventors: Lawrence A. Clevenger, Rhinebeck, NY (US); Jason D. Hibbeler, Williston, VT (US); Dongbing Shao, Wappingers Falls, NY (US); Robert C. Wong, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 15/235,273

(22) Filed: Aug. 12, 2016

(65) Prior Publication Data
US 2018/0046746 A1 Feb. 15, 2018

(51) Int. Cl.
*G06F 17/50* (2006.01)
(52) U.S. Cl.
CPC ...... *G06F 17/5081* (2013.01); *G06F 17/5045* (2013.01); *G06F 17/5068* (2013.01);
(Continued)
(58) Field of Classification Search
None
See application file for complete search history.

(56) References Cited

U.S. PATENT DOCUMENTS 7,624,369 B2 11/2009 Graur et al.
8,751,979 B1 6/2014 Socha
(Continued)

FOREIGN PATENT DOCUMENTS

CN 104408239 A 3/2015
IN 2013CN00275 11/2014

OTHER PUBLICATIONS

W. Maly, "Computer-Aided Design for VLSI Circuit Manufacturability," Proc. of the IEEE, vol. 78, No. 2, Feb. 1990, pp. 356-392.*
(Continued)

*Primary Examiner* — Leigh Garbowski
(74) *Attorney, Agent, or Firm* — Cantor Colburn LLP; Steven Meyers

(57) ABSTRACT

Embodiments include methods, design layout optimization systems, and computer program products for optimizing design layout of integrated circuits. Aspects include receiving a design layout of an integrated circuit from a design layout tool module, identifying a critical pitch in the design layout received, searching design rules forming design arc limited by identified critical pitch from a set of design rules associated with the received design layout, extracting a process variation and one or more failure mechanisms of design layout based on critical pitch and rules forming design arc identified, performing layout based ground rule calculation based on the process variation and the one or more failure mechanisms extracted, determining whether wafer risks exist in the design layout, responsive to determining the wafer risks exist in the design layout, revising the design layout and performing additional layout based ground rule calculation after the revision, and otherwise, outputting an optimized design layout.

20 Claims, 4 Drawing Sheets

(52) U.S. Cl.
CPC ........ *G06F 17/5072* (2013.01); *G06F 17/504* (2013.01); *G06F 2217/12* (2013.01); *H01L 2924/37001* (2013.01)

(56) References Cited

U.S. PATENT DOCUMENTS

| | | | |
|---|---|---|---|
| 8,799,830 B2* | 8/2014 | Robles | G06F 17/5022 716/111 |
| 9,489,479 B2* | 11/2016 | Liu | G03F 7/705 |
| 2015/0089459 A1 | 3/2015 | Liu | |
| 2015/0324512 A1 | 11/2015 | Teig et al. | |

OTHER PUBLICATIONS

P. Pathak et al., "Framework for identifying recommended rules and DFM scoring model to improve manufacturability of sub-20nm layout design," 2012 Proc. of SPIE, vol. 8327, 14 pages.*

V. Tripathi et al., "Topography aware DFM rule based scoring for silicon yield modeling," 2015 Proc. of SPIE, vol. 9427, 8 pages.*

K. Vaidyanathan et al., "Design and manufacturability tradeoffs in unidirectional and bidirectional stanard cell layouts in 14 nm node," 2012 Proc. of SPIE, vol. 8327, 13 pages.*

Disclosed Anonymously, "DRC and DFM Runtime Optimization Method," IPCOM000242479D, Jul. 17, 2015, pp. 1-7.

Lin et al., "Reliability Characterization of Chip-on-Wafer-on-Substrate (CoWoS) 3D IC Integration Technology," In Electronic Components and Technology Conference (ECTC), 2013 IEEE 63rd, pp. 366-371.

* cited by examiner

INTEGRATED CIRCUIT DESIGN LAYOUT OPTIMIZER BASED ON PROCESS VARIATION AND FAILURE MECHANISM

BACKGROUND

The present invention relates to integrated circuit design, and more specifically, to an integrated circuit design layout optimizer based on process assumptions and/or actual variations and failure mechanisms.

Certain design rules or ground rules dictate the design of integrated circuits. Design rules are maintained and released by a semiconductor foundry for its customers (layout designers of integrated circuits) to follow. Conventionally, restrictive design rules (RDRs) are used that curtail some of the "freedom" layout designers have traditionally had with regular design rules in less advanced process technologies. To achieve and maintain an acceptable return on investment for its customers and by extension for itself, a foundry may be compelled, to adopt RDRs to better ensure the completed layout design of an integrated circuit is manufacturable with the desired yield in more advanced process technologies. Multiple patterning (or multi-patterning) is a class of technologies for manufacturing integrated circuits (ICs), developed for photolithography to enhance the feature density. It is expected to be necessary for the upcoming 10 nm and 7 nm node semiconductor processes and beyond. The premise is that a single lithographic exposure may not be enough to provide sufficient resolution. Hence, additional exposures would be needed, or else positioning patterns using etched feature sidewalls (using spacers) would be necessary.

Design Arc is a collection of design rules and the sum of these design rules is often multiple of the critical pitches of the technology. The critical pitch is a fixed and predetermined length due to process restriction. When the design arc is involved, the design space becomes discretized, which makes it very difficult to resolve design rules violations without area penalty.

SUMMARY

According to an embodiment of the present invention, a computer-implemented method for optimizing design layout of an integrated circuit is described. The method includes receiving a design layout of the integrated circuit from a design layout tool module by a processor, identifying the critical pitches in the design layout received by a user using a critical pitch and rules forming design arc identification module through a graphical user interface, and searching design rules forming design arc limited by the identified critical pitch from a set of design rules associated with the received design layout by the user using the critical pitch and rules forming design arc identification module through the graphical user interface. The method also includes extracting process variations and one or more failure mechanisms of the design layout based on the critical pitch and rules forming design arc identified using a process variation and failure mechanism extraction module, performing layout based ground rule calculation based on the process variations and the failure mechanisms extracted using a layout based ground rule calculation module, and determining whether wafer risks exist in the design layout using the layout based ground rule calculation module, when wafer risks exist in the design layout. The method further includes revising the design layout via a design layout refinement module and performing additional layout based ground rule calculation after the revision, and otherwise, outputting an optimized design layout using a layout bases ground rules calculation results output module.

According to other embodiments, a system for optimizing design layout of an integrated circuit is described. The system includes a design layout tool module, a critical pitch and rules forming design arc identification module, a process variation and failure mechanism extraction module, and a layout based ground rule calculation module. In certain embodiments, the design layout tool module may be configured to design the integrated circuit based on a set of predetermined specifications and a set of design rules, and provide a design layout as output. The critical pitch and rules forming design arc identification module may be configured to identify a critical pitch of the design layout, and a set of design rules limited by a design arc associated with the design layout, by a user through a graphical user interface. The process variation and failure mechanism extraction module may be configured to extract all relevant process variations and one or more failure mechanisms associated with the design arc. The layout based ground rule calculation module may be configured to perform layout based ground rule calculation and determine wafer risks based on the layout based ground rule calculation. In certain embodiments, the layout based ground rule calculation module may include a simulation tool. The simulation tool may be configured to: generate random variations based on the process variations extracted, check against the one or more failure mechanisms extracted, and assess the wafer risks existing in the design arc.

According to yet other embodiments, a computer program product for optimizing design layout of an integrated circuit is described. The computer program product includes a non-transitory computer readable storage medium having computer executable instructions stored. When executed by a process of a system for optimizing design layout of an integrated circuit, the computer executable instructions cause the processor to perform a method including: receiving a design layout of the integrated circuit from a design layout tool module by a processor, identifying a critical pitch in the design layout received by a user using a critical pitch and rules forming design arc identification module through a graphical user interface, searching design rules forming design arc limited by the identified critical pitch from a set of design rules associated with the received design layout by the user using the critical pitch and rules forming design arc identification module through the graphical user interface, extracting process variations and one or more failure mechanisms of the design layout based on the critical pitch and rules forming design arc identified using a process variation and failure mechanism extraction module, performing layout based ground rule calculation based on the process variations and the failure mechanisms extracted using a layout based ground rule calculation module, determining whether wafer risks exist in the design layout using the layout based ground rule calculation module, when wafer risks exist in the design layout, revising the design layout via a design layout refinement module and performing additional layout based ground rule calculation after the revision, and otherwise, outputting an optimized design layout using a layout bases ground rules calculation results output module.

These and other aspects of the present invention will become apparent from the following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
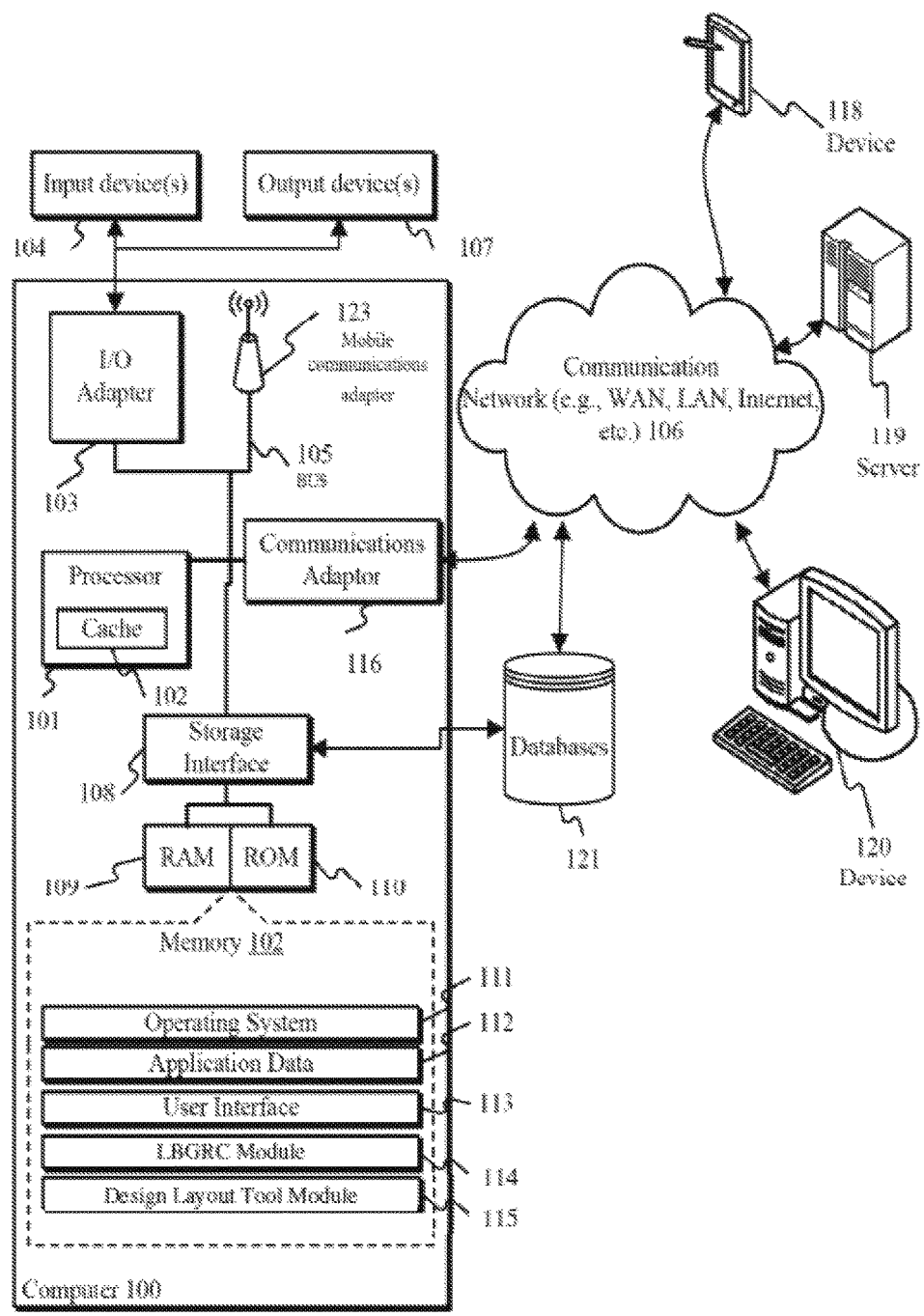
FIG. 1 depicts a block diagram of a computer system for performing integrated circuit design layout optimization based on process variation and failure mechanisms according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings FIGS. 1-4, in which certain exemplary embodiments of the present invention are shown. The present invention may, however, be embodied in many different forms and should not be construed as limited to the embodiments set forth herein; rather, these embodiments are provided so that this invention will be thorough and complete, and will fully convey the scope of the invention to those skilled in the art.

FIG. 1 illustrates a block diagram of an exemplary computing environment and computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input/output adapters 103 that may be communicatively coupled via system bus 105. Memory 102 may be operatively coupled to one or more internal or external memory devices via a storage interface 108. Communications adapter 116 may operatively connect computer 100 to one or more networks 106. System bus 105 may connect one or more user interfaces via input/output (I/O) adapter 103. I/O adapter 103 may connect multiple input devices 104 to computer 100. Input devices may include, for example, a keyboard, a mouse, a microphone, a sensor, etc. System bus 105 may also connect one or more output devices 107 via I/O adapter 103. Output device 107 may include, for example, a display, a speaker, a touchscreen, etc.

Processor 101 is a hardware device for executing hardware instructions or software, particularly that stored in a non-transitory computer-readable memory (e.g., memory 102). Processor 101 can be any custom made or commercially available processor, a central processing unit (CPU), one or more CPUs, for example, CPU 101A-101C, an auxiliary processor among several other processors associated with the computer 100, a semiconductor based microprocessor (in the form of a microchip or chip set), or generally any device for executing instructions. Processor 101 can include a cache memory 122, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 may be organized as a hierarchy of more cache levels (L1, L2, etc.).

Processor 101 may be disposed in communication with one or more memory devices (e.g., RAM 109, ROM 110, one or more external databases 121, etc.) via a storage interface 108. Storage interface 108 may also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, a gate model database 121 that stores one or more datasets of models of the gate configurations of various microprocessor designs.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Memory 102 may also be a distributed architecture, where various components are situated remote from one another, but can be accessed by processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

The instructions in memory 102 may further include application data 112, and a user interface 113.

Memory 102 may also include a layout based ground rule calculation (LBGRC) module 114, configured to receive a set of process assumptions and one or more failure mechanisms and perform layout based ground rule calculation. In certain embodiments, Memory 102 may also include a design layout tool module 115, configured to allow design layout engineers to manually and/or automatically create a design layout or make an adjustment to an existing design layout based on results of the layout based ground rule calculation by the LBGRC module 114.

I/O adapter 103 can be, for example, but not limited to, one or more buses or other wired or wireless connections. I/O adapter 103 may have additional elements (which are omitted for simplicity) such as controllers, microprocessors, buffers (caches), drivers, repeaters, and receivers, which may work in concert to enable communications. Further, I/O adapter 103 may facilitate address, control, and/or data connections to enable appropriate communications among the aforementioned components.

I/O adapter 103 can further include a display adapter coupled to one or more displays. I/O adapter 103 may be configured to operatively connect one or more input/output (I/O) devices 107 to computer 100. For example, I/O 103 may connect a keyboard and mouse, a touchscreen, a speaker, a haptic output device, or another output device. Output devices 107 may include but are not limited to a printer, a scanner, and/or the like. Other output devices may also be included, although not shown. Finally, the I/O devices connectable to I/O adapter 103 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 100 may include a mobile communications adapter 123. Mobile communications adapter 123 may include GPS, cellular, mobile, and/or other communications protocols for wireless communication.

In some embodiments, computer 100 can further include a communications adapter 116 for coupling to a network 106.

Network 106 can be an IP-based network for communication between computer 100 and any external device. Network 106 transmits and receives data between computer 100 and devices and/or systems external to computer 100. In an exemplary embodiment, network 106 can be a managed IP network administered by a service provider. Network 106 may be a network internal to an aircraft, such as, for example, an avionics network, etc. Network 106 may be implemented in a wireless fashion, e.g., using wireless protocols and technologies, such as WiFi, WiMax, etc. Network 106 may also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network 106 may be a fixed wireless network, a wireless local area network (LAN), a wireless wide area network (WAN) a personal area network (PAN), a virtual private network (VPN), intranet or other suitable network system.

Network 106 may operatively connect computer 100 to one or more devices including device 120. Network 106 may also connect computer 100 to one or more servers such as, for example, server 119.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 110 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Design rules specify geometric constraints on layout artwork of a design of an integrated circuit (IC) and provide a communication channel between integrated circuit (IC) designers and fabrication process engineers. The objectives of the design rules include obtaining a circuit with optimum yield, minimizing the area of the IC, and providing long term reliability of the IC. Design rules represent a compromise between performance and yield. In general, more conservative design rules increase yield, and more aggressive design rules increase performance.

Design Rule Checking (DRC) is the area of Electronic Design Automation that determines whether the physical layout of a particular chip layout satisfies a series of recommended parameters called Design Rules (DR). DRC is a major step during physical verification signoff on the design, which also involves Layout versus schematic (LVS) checks, exclusive OR (XOR) checks, Electrical Rule Checks (ERC) and Antenna Checks. For advanced processes, some fabricators also insist upon the use of more restricted rules to improve yield. DRs are maintained and released by a semiconductor foundry for its customers (layout designers of integrated circuits) to follow.

Conventionally, Restrictive design rules (RDRs) are used and these RDRs curtail some of the "freedom" layout designers have traditionally had with regular design rules in less advanced process technologies. To achieve and maintain an acceptable return on investment for its customers and by extension for itself, a foundry may adopt RDRs to better ensure the completed layout design of an integrated circuit is manufacturable with the desired yield in more advanced process technologies. Other design rules such as multiple patterning (or multi-patterning) may also be adopted for manufacturing integrated circuits (ICs).

A Design Arc is a set of more stringent design rules in addition to the existing design rules. The sum of design arc is equal to a critical pitch, which is a fixed and predetermined length. The requirement that the sum of design arc equals the critical pitch is necessary when the size of chip area, metal contacts, and wires getting smaller and smaller. When design arc is involved, the design space becomes discretized, which makes it very difficult to resolve design rules violations, sometimes, it is impossible to resolve all the design rule conflicts. For example, edges are shared by multiple design rules forming design arc. When the designer attempts to fix or resolve one design rule violation, he/she may cause a chain reaction that results in more design rule violations.

A new approach is needed to optimize the design layout such that the final design layout may have multiple design rule violations, but the final design layout provides a manufacturing defect-free integrated circuit. The new approach is not based on the design rule checking but based on a goal of building a manufacturing defect-free integrated circuit. A person having ordinary skills in the art may appreciate that design rules are proposed, maintained and released by a semiconductor foundry for its customers (layout designers of integrated circuits) to follow. However, these design rules are created to avoid manufacturing defects, but it does not mean that violating one or more design rules will definitely cause manufacturing defects. Therefore, the new approach is based on examining a process variation, and multiple failure mechanisms. Once the process variation and the multiple failure mechanisms are determined, the new approach assesses the wafer failure risks through simulation to perform layout based ground rule calculation to identify the failure mechanisms behind the various design rules including design arc. The new approach then reduces and minimizes the failure mechanisms while adjusting the design layout until all failure mechanisms are minimized. In certain embodiments, although the optimization method proposed here does not guarantee a design layout free of design rule violations, it does provide an optimized final design layout that will be manufacturing defect free.

Figure 2:
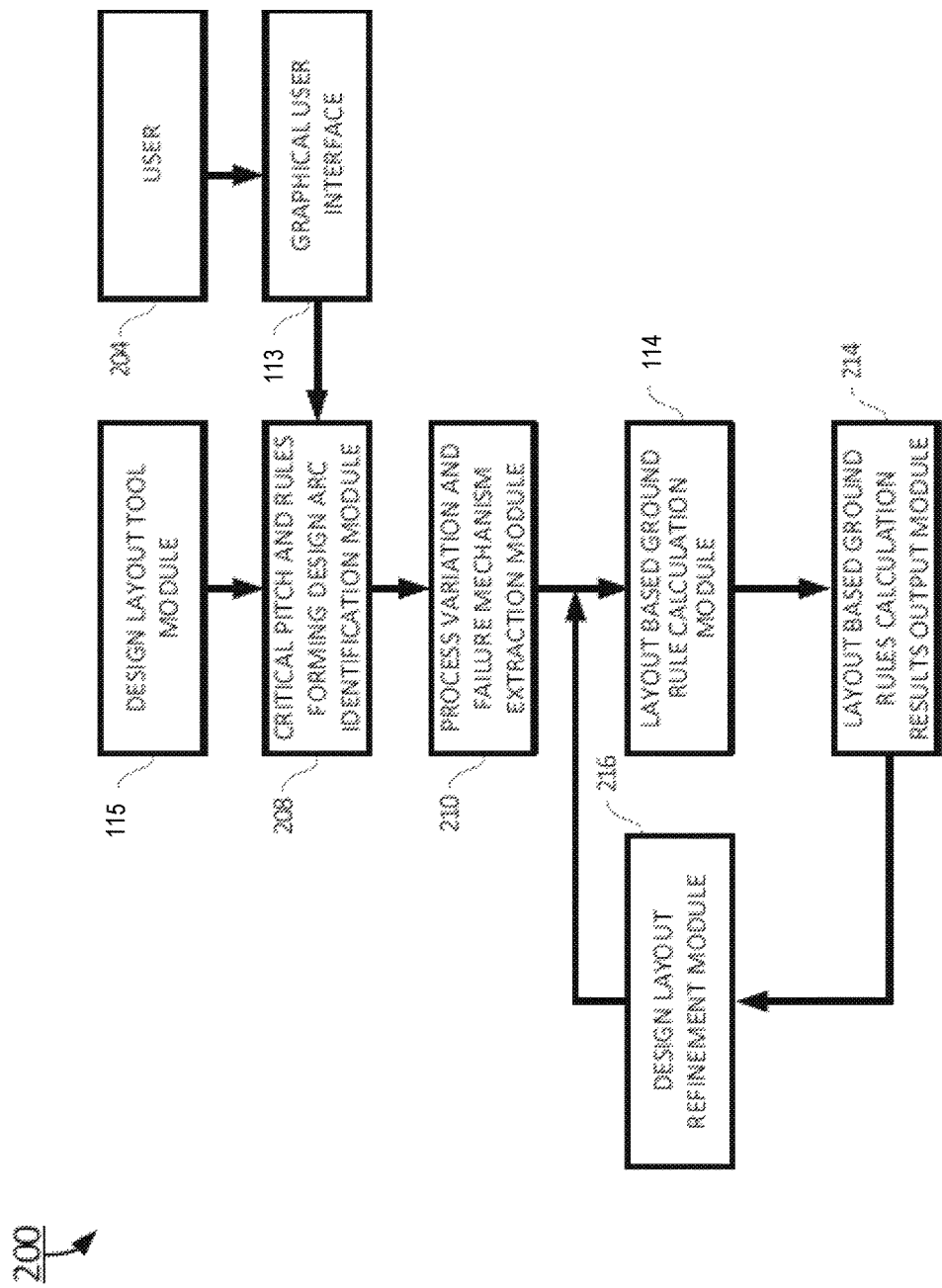
FIG. 2 depicts a block diagram of an integrated circuit design layout optimization system according to certain embodiments of the present invention.

FIG. 2 depicts a block diagram of an integrated circuit design layout optimization system 200 according to certain embodiments of the present invention. The system 200 may include a design layout tool module 115, a graphical user interface 113, a critical pitch and rules forming design arc identification module 208, a process variation and failure mechanism extraction module 210, a layout based ground rule calculation module 114, a layout based ground rules calculation results output module 214, and a design layout refinement module 216.

In certain embodiments, the design layout tool module 115 may be configured to design the integrated circuit based on a set of predetermined specifications and a set of design rules, and provide a design layout as output. In recent years, the size of the chip is getting smaller and smaller, therefore, in certain embodiments, the design layout may be a very dense initial design layout. In one embodiment, the initial dense design layout may be received from a third party design tool, or from an integrated circuit design database (not shown in FIG. 2).

In certain embodiments, manufacturing processes have inherent limitations in accuracy. Design rules are determined by experience and design rules specify the geometry of masks, which will provide reasonable yields. The design rules may include, but are not limited to, minimum size, minimum spacing, alignment, overlapping, composition and other negative features. Therefore, design rules are requirements, and even if some of the design rules may not be met, but violating some of the design rules does not necessarily result in manufacturing defects.

In certain embodiments, the critical pitch and rules forming design arc identification module 208 can be used to identify a critical pitch of the initial design layout, and a set of design rules limited by a design arc associated with the design layout, by a user 204 through a graphical user interface 113. Design Arc is a set of more stringent design rules in addition to the existing design rules. The sum of design arc is equal to a critical pitch and the critical pitch is a fixed and predetermined length.

In certain embodiments, the process variation and failure mechanism extraction module 210 may extract a process variation and one or more failure mechanisms associated with the initial design layout. The process variation and failure mechanism extraction module 210 can identify design levels in the design arc identified by the critical pitch and rules forming design arc identification module 208, and extract a process variation. Process variation is the naturally occurring variation in the attributes of layout features (length, widths, oxide thickness) when integrated circuits are fabricated. The amount of process variation becomes particularly pronounced at smaller process nodes as the variation becomes a larger percentage of the full length or width of the feature and as feature sizes approach the fundamental dimensions such as the size of atoms and the wavelength of usable light for patterning lithography masks.

In addition to the extracted process variation, one or more failure mechanisms can be extracted by the process variation and failure mechanism extraction module 210. In certain embodiments, the failure mechanism may include, but is not limited to, one or more failures in manufacturing defects during process integration, and one or more failures in performance related parameters. For example, the failure mechanism may include defect generation during manufacturing, short of metals or high resistance etc. during integrated circuit operation.

In certain embodiments, the layout based ground rule calculation (LBGRC) module 114 can perform layout based ground rule calculation and determine wafer risks based on the layout based ground rule calculation. For example, a design rule requires checking minimum space between a metal A and a metal B. The minimum space between the metal A and the metal B depends on following variables: (1) edge variation of the metal A, (2) edge variation of the metal B, and (3) shape overlay between the metal A and the metal B. All these variations are independently random. In certain embodiments, the layout based ground rule calculation module 114 may include a simulation tool that generates random variations based on the process variation extracted, checks against the one or more failure mechanisms extracted, assesses the wafer risks existing in the design layout, and calculates the minimum space between the metal A and the metal B.

In certain embodiments, the layout based ground rule calculation module 114 is further configured to evaluate the failure mechanisms based on the nature of each individual manufacturing faults and application of the integrated circuit and to prioritize the failure mechanisms based on the nature of each individual manufacturing faults and application of the integrated circuit. Thereby, maintaining design constraints based on design arc and minimizing the failure mechanisms while one or more design rules may be violated.

In certain embodiments, the system for optimizing design layout of an integrated circuit can include a design layout refinement module 216. The design layout refinement module 216 is configured to revise and adjust the design layout based on the results of the layout based ground rule calculation against each of the remaining failure mechanisms until all failure mechanisms are minimized.

Figure 3:
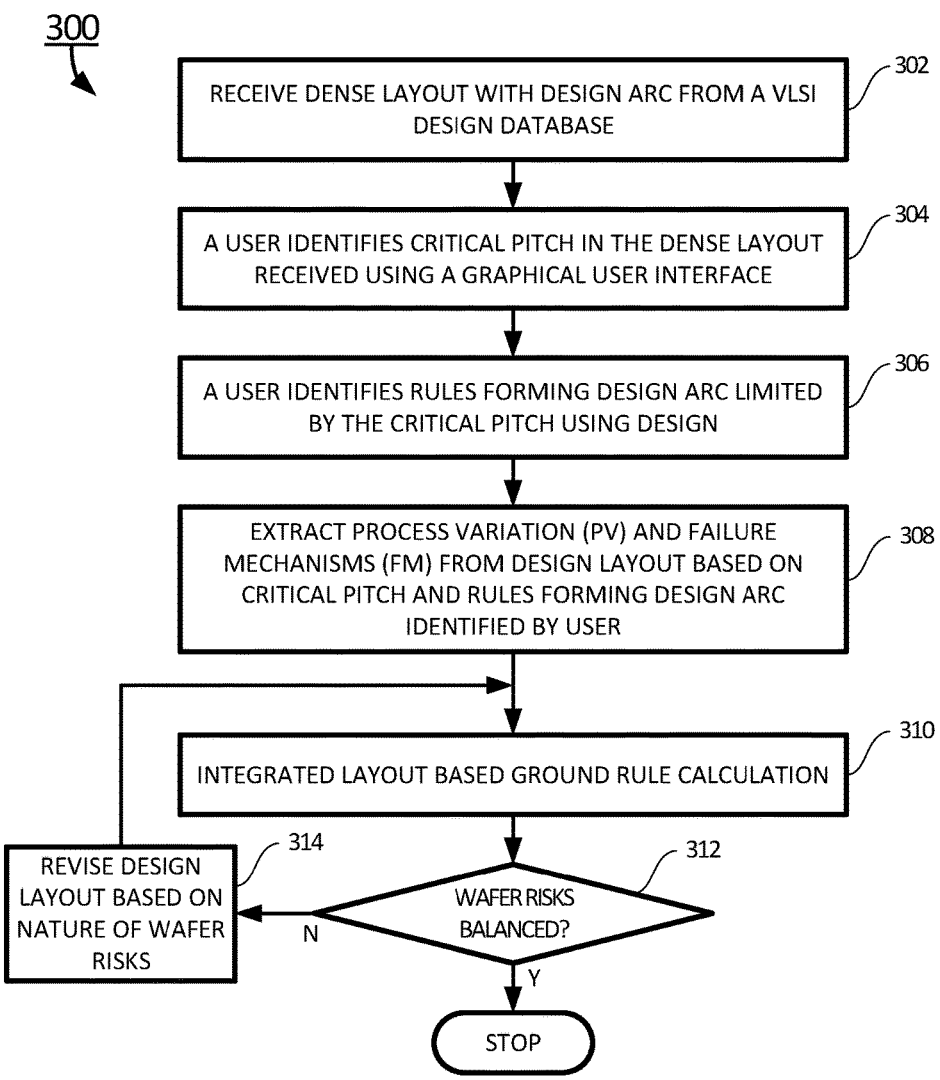
FIG. 3 depicts a flow chart of a method for performing integrated circuit design layout optimization based on process variations and failure mechanisms according to certain embodiments of the present invention.

FIG. 3 depicts a flow chart of a method 300 for performing integrated circuit design layout optimization based on process assumptions and failure mechanisms according to certain embodiments of the present invention.

As shown in block 302, a processor 101 of an integrated circuit design layout optimization system may receive a design layout of an integrated circuit from a design layout tool module 115. In certain embodiments, the design layout may also be retrieved from an integrated circuit design database. This design layout may be an initial design layout prior to optimization. The initial design layout may contain a certain number of design rule violations, and include certain manufacturing defects or performance defects if the integrated circuit is manufactured.

As shown in block 304, a user 204 may identify a critical pitch and rules forming design arc identification module 208 through a graphical user interface 206 to manually identify a critical pitch in the design layout received. In certain embodiments, the identifying process may be carried out automatically through the critical pitch and rules forming design arc identification module 208.

As shown in block 306, the user 204 may search design rules forming design arc limited by the identified critical pitch from a set of design rules associated with the design layout received using the critical pitch and rules forming design arc identification module 208 through the graphical user interface 206. The critical pitch is a fixed and predetermined length and it can be found in the design layout of the integrated circuit. When design arc is used, a sum of several segments of design arc must equal to the critical pitch. This limitation may add additional design rules to the design layout, and this operation is directed to identify all additional design rules limited by the identified critical pitch. In one embodiment, this search can be performed by the user 204 manually. In another embodiment, this search may be performed by using the critical pitch and rules forming design arc identification module 208. In certain embodiments, results of the search may be reviewed by the user 204, and compared with similar design layouts of other integrated circuits. This review process may be performed manually by the user 204 or automatically by the critical pitch and rules forming design arc identification module 208.

As shown in block 308, the user 204 may use a process variation and failure mechanism extraction module 210 to extract a process variation and one or more failure mechanisms of the design layout based on the critical pitch and rules forming design arc identified.

Process variation is the naturally occurring variation in the attributes of integrated circuit components (length, widths, oxide thickness) when integrated circuits are fabricated. The amount of process variation becomes particularly pronounced at smaller process nodes as the variation becomes a larger percentage of the full length or width of the features and as feature sizes approach the fundamental dimensions such as the size of atoms and the wavelength of usable light for patterning lithography masks. The process variation is critical in reducing manufacturing defects, and assessing wafer failure risks.

In certain embodiments, the one or more failure mechanisms of the design layout are the factors behind the multiple design rules to reduce manufacturing defects, and reduce wafer failure risks. Conventionally, design layout optimization is focused on resolving and minimizing design rule violations. One of the focuses of the present invention is to minimize wafer failures instead of minimizing design rule violations. Therefore the operation at block 308 is important to identify the failure mechanisms behind the design rules and identify the failure mechanisms as the root causes of integrated circuit manufacturing defects, instead of resolving design rule conflicts or violations on the surface. Block 308 will be further described in FIG. 4.

As shown in block 310, layout based ground rule calculation based on the process variation and the failure mechanisms extracted in block 308 is performed by a layout based ground rule calculation (LBGRC) module 114.

In certain embodiments, the LBGRC module 114 may include a simulation tool that generates random variations based on the process variation extracted in block 308, checks against the failure mechanisms extracted in block 308, assesses the wafer risks existing in the design layout.

As shown in query block 312, results from the layout based ground rule calculation based on the process variation and the failure mechanisms extracted in block 308 is examined to determine the wafer failure risks. All failure mechanisms are evaluated and the wafer failure risks calculated using the simulation tool. When the results indicate that there are still certain wafer failure risks exist in the design layout, the wafer risks are not balanced, the method 300 may proceed to block 314. Otherwise, when all failure mechanisms are minimized, an optimized design layout of the integrated circuit is achieved, even though there may still have certain design rule conflicts or violations remain in the design layout. The method 300 may proceed to conclude the design layout optimization.

As shown in query block 314, when the results indicate that there are still certain wafer failure risks exist in the design layout, and the wafer risks are not balanced, the design layout may be revised by using a design layout refinement module 216 based on the simulation results and narrow down the revisions to the remaining failure mechanisms. Once the revisions are completed, additional layout based ground rule calculation may be performed on the revised design layout by the LBGRC module 114. This process may be repeated until all failure mechanisms are minimized to complete the design layout optimization. In certain embodiments, the revisions by the design layout refinement module 216 may not resolve the failure mechanisms extracted, and the design layout may need to be sent to the design layout tool module 115 to make certain significant revisions.

Figure 4:
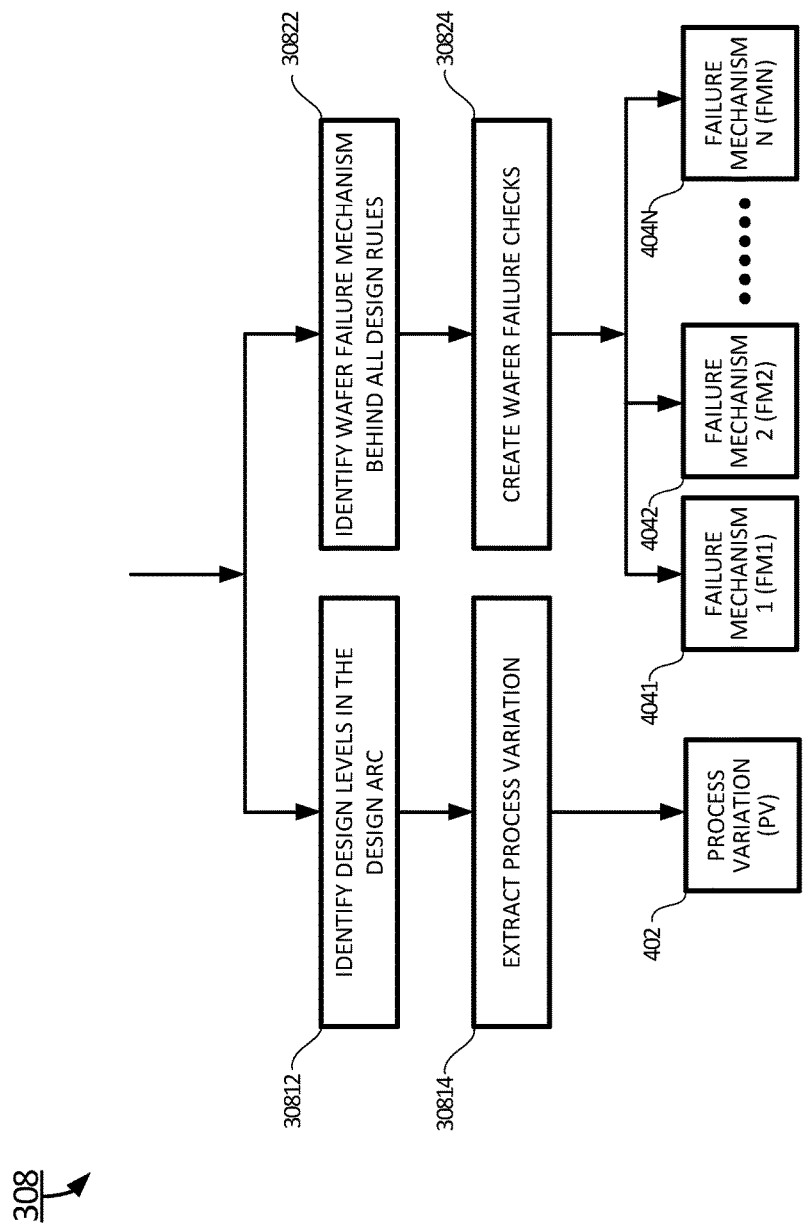
FIG. 4 depicts a detailed operation block of the method as shown in FIG. 3 according to certain embodiments of the present invention.

Referring again to block 308, the user 204 may use a process variation and failure mechanism extraction module 210 to extract the process variation and one or more failure mechanisms of the design layout based on the critical pitch and rules forming design arc identified. FIG. 4 depicts block 308 in detail of the method 300 as shown in FIG. 3 according to certain embodiments of the present invention.

At the start, the method 300 may proceed to two different routes to extract the process variation through blocks 30812 and 30814, and extract the failure mechanisms through blocks 30822 and 30824.

As shown in block 30812, the process variation and failure mechanism extraction module 210 is used to identify design levels in the design arc. In certain embodiments, the design arc may include predetermined design levels. In one embodiment, the design arc may include 3 design levels.

As shown in block 30814, the process variation is extracted by the process variation and failure mechanism extraction module 210. The result of the extraction of the process variation is a process variation (PV) 402.

As shown in block 30822, the process variation and failure mechanism extraction module 210 is used to identify all possible failure mechanisms of the design layout behind the design rules identified in block 306.

As shown in block 30824, the process variation and failure mechanism extraction module 210 may create a set of wafer failure checks for each of the possible failure mechanisms of the design layout behind the design rules identified in block 306 such that the LBGRC module 114 may check each one of the possible failure mechanisms of the design layout behind the design rules to ensure quality of the design layout. The results of the extraction of the lure mechanisms may include N failure mechanisms: Failure Mechanism 1 (FM1) 4041, Failure Mechanism 2 (FM2) 4042, . . . , and Failure Mechanism N (FMN) 404N, where N is a positive integer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor, a design layout of an integrated circuit, the integrated circuit comprising at least one wafer;
   identifying, by a user through a graphical user interface, a critical pitch of the design layout;
   identifying, by the user through the graphical user interface, a set of design rules forming a design arc that is limited by the critical pitch;
   extracting, by the processor, a process variation and a plurality of failure mechanisms of the design layout, wherein the extracting is based at least in part on the critical pitch and based at least in part on the set of design rules, wherein a failure mechanism is a factor behind a design rule to reduce manufacturing defects and reduce wafer failure risks;
   performing, by the processor, a ground rule calculation based at least in part on the process variation and the plurality of failure mechanisms;
   assessing, by the processor, wafer failure risks by performing a simulation based at least in part on the ground rule calculation;
   revising the design layout as a revised design layout based at least in part on a type of the wafer failure risks, wherein the revised design layout reduces and minimizes the plurality of failure mechanisms instead of minimizing design rule violations; and manufacturing the integrated circuit using the revised design layout.

2. The computer-implemented method of claim 1, wherein identifying the set of design rules forming the design arc that is limited by the critical pitch comprises searching a plurality of design rules received with the received design layout.

3. The computer-implemented method of claim 1, wherein the critical pitch is a fixed and predetermined length.

4. The computer-implemented method of claim 1, wherein the plurality of failure mechanisms comprises:
   a failure in manufacturing defects during a process integration; and
   a failure in a performance related parameter.

5. The computer-implemented method of claim 1, wherein the simulation comprises:
   generating random variations based on the process variation;
   checking against the plurality of failure mechanisms; and
   assessing the wafer failure risk existing in the design layout.

6. The computer-implemented method of claim 1, wherein the process variation comprises:
   a detailed process flow;
   a target process variation; and
   actual variations measured from the at least one wafer or from a simulation.

7. The computer-implemented method of claim 1, wherein a sum of the design arc is equal to the critical pitch.

8. A system comprising:
   a memory comprising computer readable instructions; and
   a processor for executing the computer readable instructions for performing a method, the method comprising:
      receiving, by the processor, a design layout of an integrated circuit, the integrated circuit comprising at least one wafer;
      identifying, by a user through a graphical user interface, a critical pitch of the design layout;

identifying, by the user through the graphical user interface, a set of design rules forming a design arc that is limited by the critical pitch;
extracting, by the processor, a process variation and a plurality of failure mechanisms of the design layout, wherein the extracting is based at least in part on the critical pitch and based at least in part on the set of design rules, wherein a failure mechanism is a factor behind a design rule to reduce manufacturing defects and reduce wafer failure risks;
performing, by the processor, a ground rule calculation based at least in part on the process variation and the plurality of failure mechanisms;
assessing, by the processor, wafer failure risks by performing a simulation based at least in part on the ground rule calculation;
revising the design layout as a revised design layout based at least in part on a type of the wafer failure risks, wherein the revised design layout reduces and minimizes the plurality of failure mechanisms instead of minimizing design rule violations; and
manufacturing the integrated circuit using the revised design layout.

9. The system of claim 8, wherein identifying the set of design rules forming the design arc that is limited by the critical pitch comprises searching a plurality of design rules received with the received design layout.

10. The system of claim 8, wherein the critical pitch is a fixed and predetermined length.

11. The system of claim 8, wherein the plurality of failure mechanisms comprises:
a failure in manufacturing defects during a process integration; and
a failure in a performance related parameter.

12. The system of claim 8, wherein the simulation comprises:
generating random variations based on the process variation;
checking against the plurality of failure mechanisms; and
assessing the wafer failure risk existing in the design layout.

13. The system of claim 8, wherein the process variation comprises:
a detailed process flow;
a target process variation; and
actual variations measured from the at least one wafer or from a simulation.

14. The system of claim 8, wherein a sum of the design arc is equal to the critical pitch.

15. A computer program product comprising:
a computer readable storage medium having program instructions embodied therewith, the program instructions executable by a processor to cause the processor to perform a method comprising:
receiving, by the processor, a design layout of an integrated circuit, the integrated circuit comprising at least one wafer;
identifying, by a user through a graphical user interface, a critical pitch of the design layout;
identifying, by the user through the graphical user interface, a set of design rules forming a design arc that is limited by the critical pitch;
extracting, by the processor, a process variation and a plurality of failure mechanisms of the design layout, wherein the extracting is based at least in part on the critical pitch and based at least in part on the set of design rules, wherein a failure mechanism is a factor behind a design rule to reduce manufacturing defects and reduce wafer failure risks;
performing, by the processor, a ground rule calculation based at least in part on the process variation and the plurality of failure mechanisms;
assessing, by the processor, wafer failure risks by performing a simulation based at least in part on the ground rule calculation;
revising the design layout as a revised design layout based at least in part on a type of the wafer failure risks, wherein the revised design layout reduces and minimizes the plurality of failure mechanisms instead of minimizing design rule violations; and
manufacturing the integrated circuit using the revised design layout.

16. The computer program product of claim 15, wherein identifying the set of design rules forming the design arc that is limited by the critical pitch comprises searching a plurality of design rules received with the received design layout.

17. The computer program product of claim 15, wherein the critical pitch is a fixed and predetermined length.

18. The computer program product of claim 15, wherein the plurality of failure mechanisms comprises:
a failure in manufacturing defects during a process integration; and
a failure in a performance related parameter.

19. The computer program product of claim 15, wherein the simulation comprises:
generating random variations based on the process variation;
checking against the plurality of failure mechanisms; and
assessing the wafer failure risk existing in the design layout.

20. The computer program product of claim 15, wherein the process variation comprises:
a detailed process flow;
a target process variation; and
actual variations measured from the at least one wafer or from a simulation.

* * * * *